(12) United States Patent
Yamamoto (10) Patent No.: US 11,867,839 B2
(45) Date of Patent: Jan. 9, 2024

(54) LIDAR DEVICE HEATING OPTICAL WINDOW

(71) Applicant: DENSO CORPORATION, Kariya (JP)

(72) Inventor: Masahiro Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 766 days.

(21) Appl. No.: 16/936,379

(22) Filed: Jul. 22, 2020

(65) Prior Publication Data

US 2020/0348397 A1    Nov. 5, 2020

Related U.S. Application Data

(63) Continuation of application No. PCT/JP2019/002098, filed on Jan. 23, 2019.

(30) Foreign Application Priority Data

Jan. 24, 2018    (JP) ................... 2018-009668

(51) Int. Cl.
*G01S 7/481*    (2006.01)

(52) U.S. Cl.
CPC .......... *G01S 7/4813* (2013.01); *G01S 7/4812* (2013.01)

(58) Field of Classification Search
CPC ........... G01S 2007/4977; G01S 7/4813; G01S 7/4812
See application file for complete search history.

(56) References Cited

U.S. PATENT DOCUMENTS

| | | | | |
|---|---|---|---|---|
| 5,321,490 A | * | 6/1994 | Olson | G01S 7/486 |
| | | | | 356/5.03 |
| 2003/0019860 A1 | * | 1/2003 | Sol | H05B 3/86 |
| | | | | 219/203 |
| 2006/0152705 A1 | * | 7/2006 | Yoshida | G01S 7/4813 |
| | | | | 356/28 |
| 2012/0103960 A1 | | 5/2012 | Bressand et al. | |
| 2014/0320845 A1 | * | 10/2014 | Bayha | G01S 17/04 |
| | | | | 356/5.03 |
| 2014/0332676 A1 | * | 11/2014 | Bayha | G01S 7/4813 |
| | | | | 250/227.26 |

(Continued)

FOREIGN PATENT DOCUMENTS

| | | |
|---|---|---|
| JP | S60-149984 A | 8/1985 |
| JP | 2007-220636 A | 8/2007 |
| JP | 2012-225821 A | 11/2012 |

*Primary Examiner* — Yuqing Xiao
*Assistant Examiner* — Zhengqing Qi
(74) *Attorney, Agent, or Firm* — MASCHOFF BRENNAN (57) ABSTRACT

A heater is provided to heat an optical window. The inner face of the optical window is partitioned by the shield plate into a first part for the phototransmitter and a second part for the photoreceiver, the first part for the phototransmitter being arranged to face the first space, the second part for the photoreceiver being arranged to face the second space. The heater includes a first film, a second film, two phototransmitter electrodes, and two photoreceiver electrodes. The first film is a transparent conductive film arranged to cover the first part for the phototransmitter. The second film is a transparent conductive film arranged to cover the second part for the photoreceiver. The two phototransmitter electrodes are configured to energize the first film. The two photoreceiver electrodes are configured to energize the second film.

3 Claims, 6 Drawing Sheets

(56) References Cited

U.S. PATENT DOCUMENTS

| | | | |
|---|---|---|---|
| 2015/0260843 A1* | 9/2015 | Lewis | G02B 26/106 356/5.01 |
| 2017/0097419 A1 | 4/2017 | Murayama et al. | |
| 2017/0167868 A1 | 6/2017 | Hirai | |
| 2018/0045827 A1* | 2/2018 | Yoon | G01J 1/0204 |

* cited by examiner

LIDAR DEVICE HEATING OPTICAL WINDOW

CROSS-REFERENCE TO RELATED APPLICATION

The present application is a continuation application of International Application No. PCT/JP2019/002098, filed on Jan. 23, 2019, which claims priority to Japanese Patent Application No. 2018-009668, filed on Jan. 24, 2018. The contents of these applications are incorporated herein by reference in their entirety.

BACKGROUND

Technical Field

The present disclosure relates to a lidar device provided with an optical window.

Background Art

A lidar device configured to emit light and receive reflected light to detect information such as the distance to the object that reflected the light is known. Lidars are also described as LIDAR, which is an abbreviation for Light Detection and Ranging. This type of device comprises a housing, and an optical window that transmits light is provided at a part of the housing though which light emitted from the inside of the housing to the outside and light entering the housing from the outside pass.

SUMMARY

In the present disclosure, provided is a lidar device as the following. The lidar device includes a light detection module, an optical window, a shield plate, and a heater. An inner face of the optical window is partitioned by the shield plate into a first part for a phototransmitter and a second part for the photoreceiver, the first part for the phototransmitter being arranged to face a first space, the second part for the photoreceiver being arranged to face a second space. The heater includes a first film, a second film, two phototransmitter electrodes, and two photoreceiver electrodes. The first film is a transparent conductive film arranged to cover the first part for the phototransmitter. The second film is a transparent conductive film arranged to cover the second part for the photoreceiver. The two phototransmitter electrodes are configured to energize the first film. The two photoreceiver electrodes are configured to energize the second film.

DETAILED DESCRIPTION OF THE PREFERRED EMBODIMENTS

PTL 1 discloses a technique of using heater wiring, wired so that it avoids the part which transmits light, as a heater for heating the optical window in order to remove raindrops, snow, dirt, and the like attached to the optical window.

[PTL 1] Japanese Patent Application Publication (Translation of PCT Application) NO 2015-506459

However, as a result of detailed examination by the discloser, the following problems were found with the prior art described in PTL 1.

That is, the effect of the heating by the heater wire becomes weaker as the distance from the part provided with the wiring increases. Therefore, in the prior art in which a heater wire is provided around the part which transmits light, the zone that should be heated the most cannot be efficiently heated.

One aspect of the present disclosure is to provide a technique for efficiently heating an optical window of a lidar device.

A lidar device according to an aspect of the present disclosure includes a light detection module, an optical window, a shield plate, and a heater.

The light detection module includes a phototransmitter and a photoreceiver. The phototransmitter transmits a light beam to be scanned along a preset scanning direction. The photoreceiver receives the light arriving from a scanning range.

The optical window is provided in a housing in which the light detection module is housed, and the optical window is configured to enable both the transmitted light and the received light by the light detection module to pass therethrough. The shield plate protrudes from an inner face of the optical window facing the inside of the housing, and the shield plate is placed between a first space in which the phototransmitter is provided and a second space in which the photoreceiver is provided, the shied part is configured to prevent light leakage between the phototransmitter and the photoreceiver. The heater heats the optical window.

The inner face of the optical window is partitioned by the shield plate into a first part for the phototransmitter and a second part for the photoreceiver, the first part for the phototransmitter being arranged to face the first space, the second part for the photoreceiver being arranged to face the second space. The heater includes a first film (a phototransmitter film), a second film (a photoreceiver film), two phototransmitter electrodes, and two photoreceiver electrodes. The first film is a transparent conductive film arranged to cover the first part for the phototransmitter. The second film is a transparent conductive film arranged to cover the second part for the photoreceiver. The two phototransmitter electrodes are configured to energize the first film. The two photoreceiver electrodes are configured to energize the second film.

With such a configuration, since the heater heating the optical window includes a transparent conductive film and two electrodes, the entire transparent conductive film sandwiched between the two electrodes can be uniformly heated. Therefore, the part of the optical window which transmits light can be heated uniformly and efficiently.

In addition, the transparent conductive film constituting a part of the heater is provided individually in each of the part for the phototransmitter and the part for the photoreceiver of the optical window. Therefore, the distance between the two electrodes for energizing the transparent conductive film can be reduced, which makes it possible to heat the optical window efficiently to the required temperature at a relatively low voltage.

An embodiment of the present disclosure will be described with reference to the drawings.

1. Configuration

Figure 1:
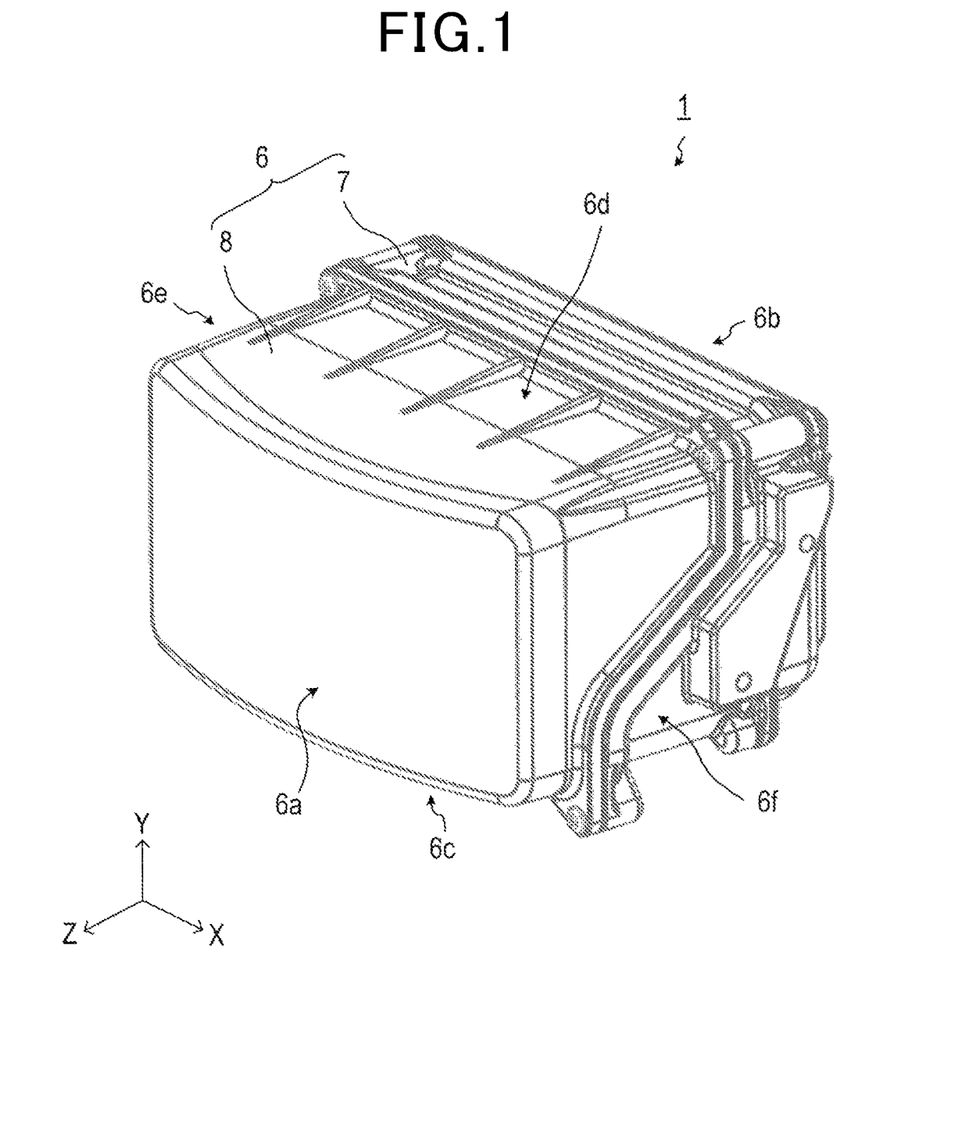
FIG. 1 is a perspective view showing the outer appearance of a lidar device.

A lidar device 1 of the present embodiment shown in FIG. 1 is mounted on a vehicle to, for example, detect various objects that exist around the vehicle. A lidar is also described as LIDAR. LIDAR is an abbreviation for Light Detection and Ranging.

The lidar device 1 comprises a housing 6 as shown in FIG. 1. The housing 6 is a resin box formed in a rectangular parallelepiped shape, and has a front face 6a, a back face 6b, a bottom face 6c, a top face 6d, a left side face 6e, and a right side face 6f. In addition, the housing 6 houses a light detection module 2 and a heater 9 described later. Hereinafter, the direction along the longitudinal direction of the front face 6a having a substantially rectangular shape is defined as the X-axis direction, the direction along the lateral direction of the front face 6a is defined as the Y-axis direction, and the direction orthogonal to the XY plane is defined as the Z-axis direction. In the X-axis direction, the front face 6a side is defined as front and the back face 6b side is defined as rear; in the Z-axis direction, the bottom face 6c side is defined as down and the top face 6d side is defined as up; and in the Y-axis direction, the left side face 6e side is defined as left and the right side face 6f side is defined as right. That is, left and right are defined as the directions as viewed from in front of the housing 6.

The housing 6 includes a housing body 7 and a lid part 8. The lid part 8 includes the entire front face 6a of the housing 6, and the housing body 7 includes the entire back face 6b of the housing.

2. Light Detection Module

Figure 2:
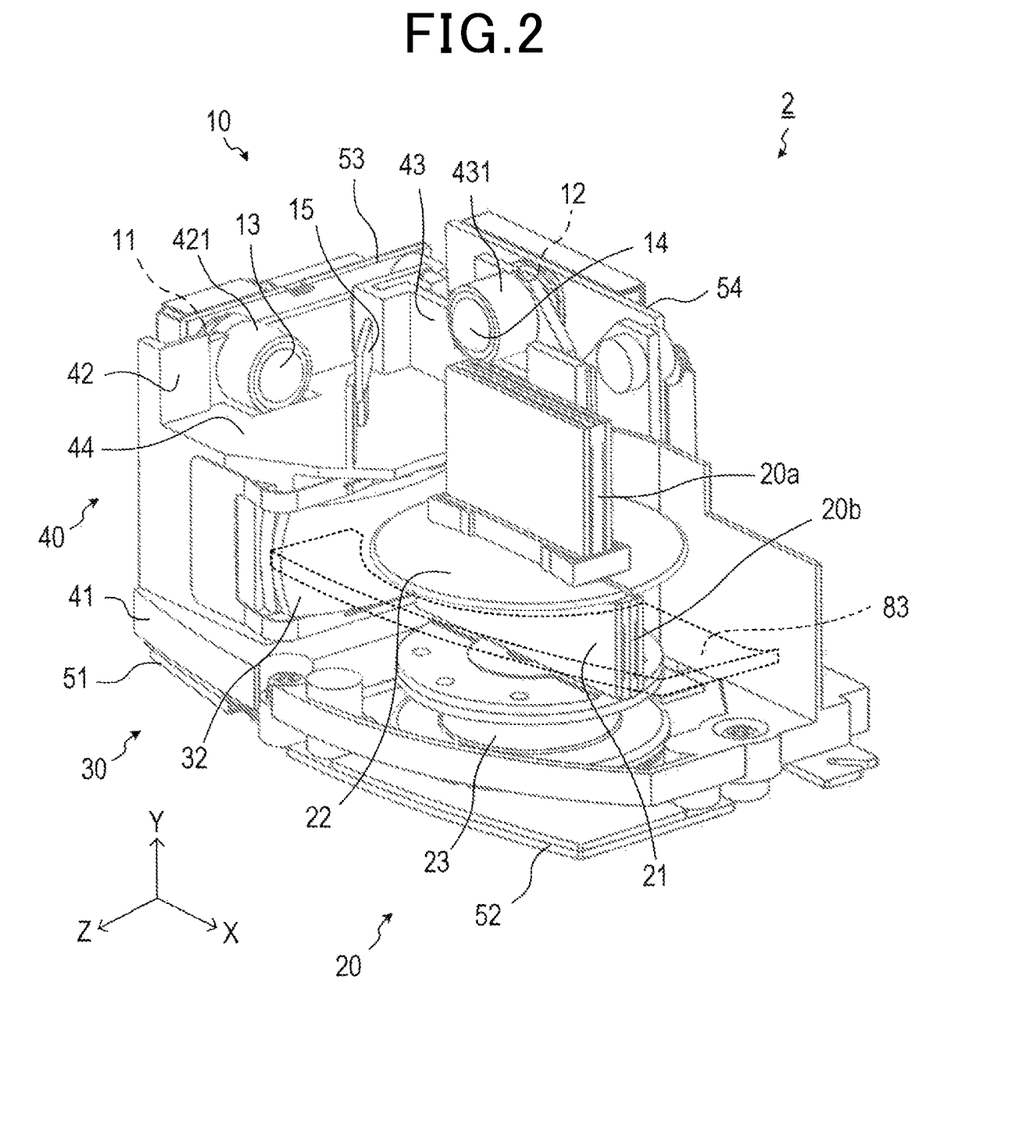
FIG. 2 is a perspective view showing the configuration of a light detection module housed in the housing of the lidar device.
Figure 3:
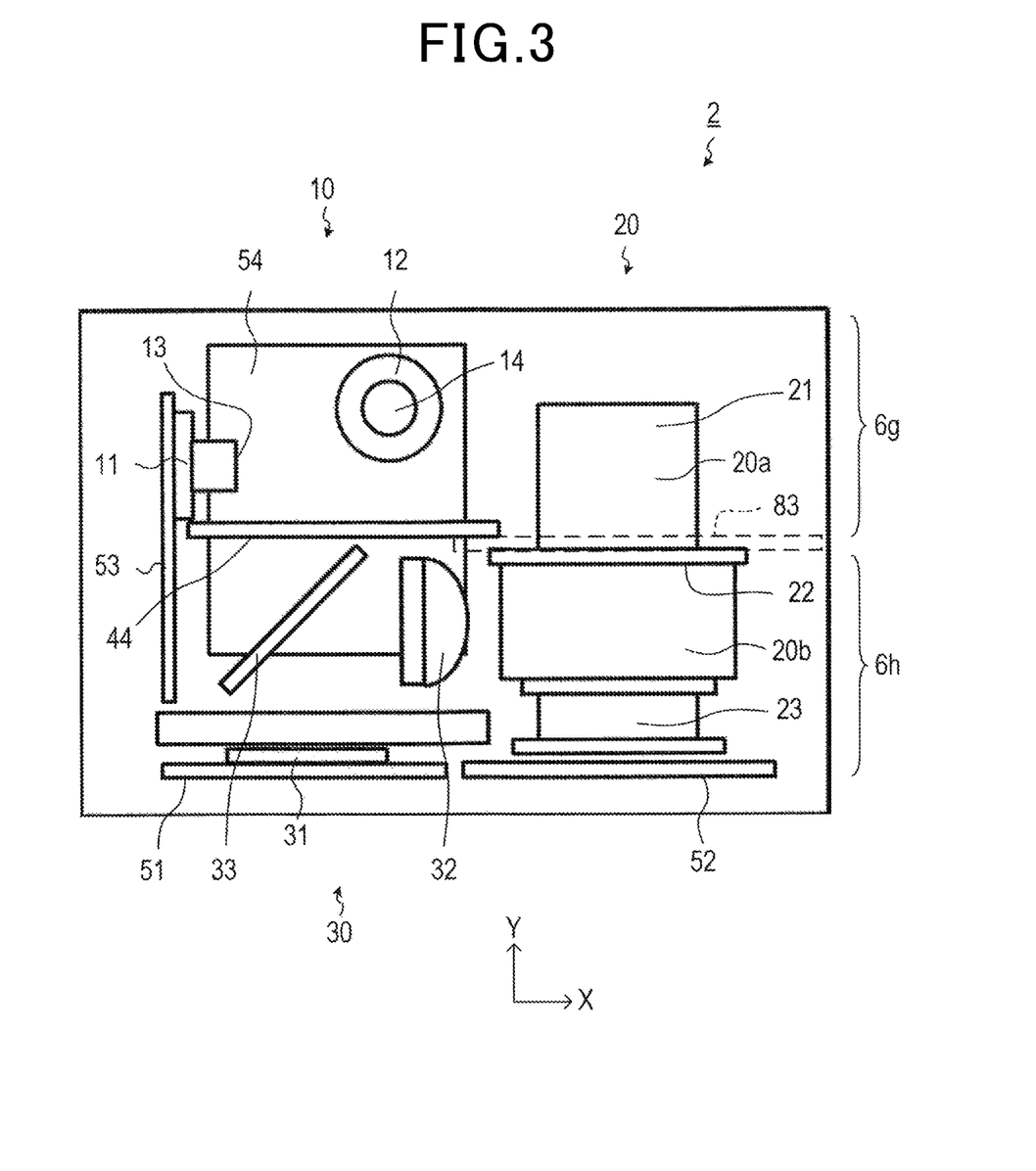
FIG. 3 is a schematic view showing the position of a partition plate with respect to the light detection module, as viewed from the front.
Figure 5:
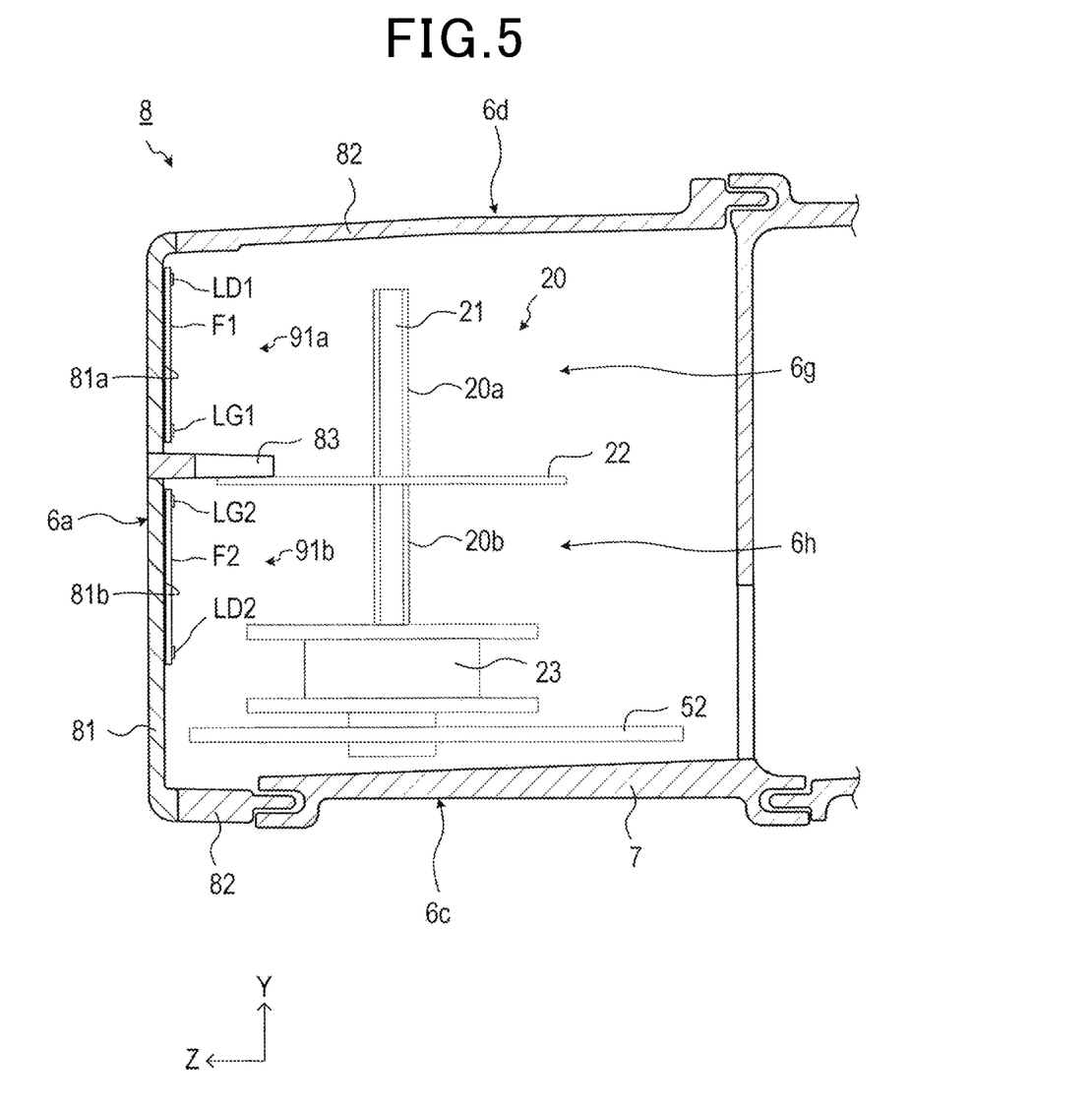
FIG. 5 is a schematic view showing the position of the scanning part with respect to the optical window, as viewed from the side.

A light detection module 2 includes a phototransmitter 10, a scanning part 20, and a photoreceiver 30, as shown in FIGS. 2, 3, and 5. The light detection module 2 is mounted on the housing body 7 via the frame 40.
[2-1. Scanning Part]

The scanning part 20 includes a mirror module 21, a partition plate 22, and a motor 23.

The mirror module 21 is a plate-shaped member having two deflecting mirrors for reflecting light on both sides. The mirror module 21 is protrudingly provided on the motor 23 and rotates according to the driving of the motor 23.

The partition plate 22 is a circular plate-shaped member provided integrally with the mirror module 21 near the center of the mirror module 21 in the vertical direction such that it is orthogonal to the rotation axis of the rotational movement.

Hereinafter, the part of the mirror module 21 above the partition plate 22 is referred to as a phototransmitting deflecting part 20a, and the part below the partition plate 22 is referred to as a photoreceiving deflecting part 20b.
[2-2. Light Emitting Part]

The phototransmitter 10 includes two light sources 11 and 12. The phototransmitter 10 may include two phototransmitting lenses 13 and 14, and a phototransmitting turning mirror 15.

A semiconductor laser is used for each of the light sources 11 and 12.

The phototransmitting lens 13 is a lens placed so as to face the light emitting face of the light source 11. Similarly, the phototransmitting lens 14 is a lens placed so as to face the light emitting face of the light source 12.

The phototransmitting turning mirror 15 is a mirror that changes the traveling direction of light.

The light source 11 is placed so that the light output from the light source 11 and transmitted through the phototransmitting lens 13 directly reaches the phototransmitting deflecting part 20a.

The phototransmitting turning mirror 15 is placed so that the light output from the light source 12 and transmitted through the phototransmitting lens 14 is bent by approximately 90° by the phototransmitting turning mirror 15, and the light whose path has been bent by the phototransmitting turning mirror 15 is incident on the phototransmitting deflecting part 20a.

In this example, the light source 11 is placed near the left side face 6e of the housing 6 so as to output light toward the right side, and the light source 12 is placed near the back face 6b of the housing 6 so as to output light toward the front side. Further, the phototransmitting turning mirror 15 is placed so as not to block the path of the light traveling from the light source 11 to the phototransmitting deflecting part 20a.
[2-3. Photoreceiver]

The photoreceiver 30 includes a photoreceiving element 31. The photoreceiver 30 may include a photoreceiving lens 32 and a photoreceiving turning mirror 33.

The photoreceiving element 31 has an APD array including a plurality of APDs arranged in a row. APD is an abbreviation for avalanche photodiode.

The photoreceiving lens 32 is a lens that narrows the light coming from the photoreceiving deflecting part 20b.

The photoreceiving turning mirror 33 is a mirror that changes the traveling direction of light.

The photoreceiving element 31 is placed in the lower part of the photoreceiving turning mirror 33. Note that, in FIG. 3, a part of the frame 40 is omitted in order that the arrangement of the parts can be easily seen.

The photoreceiving turning mirror 33 is placed so as to bend the path of light downward by approximately 90° so that the light incident thereon from the photoreceiving deflecting part 20b via the photoreceiving lens 32 reaches the photoreceiving element 31.

The photoreceiving lens 32 is placed between the photoreceiving deflecting part 20b and the photoreceiving turning mirror 33. The photoreceiving lens 32 narrows the beam diameter of the light beam incident on the photoreceiving element 31 so that the beam diameter is in the order of the element width of the APDs.
[2-4. Frame]

The frame 40 is a member for assembling the components of the phototransmitter 10, the scanning part 20, and the photoreceiver 30 into one body so that the parts can be assembled into the housing 6 in a state where the arrangement of the components is fixed.

The frame 40 includes a lower frame part 41, a frame side face part 42, a frame rear face part 43, and a partition part 44.

A photoreceiving substrate 51 to which the photoreceiving element 31 is attached and a motor substrate 52 to which the scanning part 20 is attached are attached to the lower frame part 41 from below. Therefore, holes are provided in the lower frame part 41 at a position where the light from the photoreceiving turning mirror 33 to the photoreceiving element 31 passes through and at a position where the motor 23 of the scanning part 20 is placed.

Assuming that the face of the frame side face part 42 on the side facing the scanning part 20 is its front face, a protruding cylindrical holder 421 is provided on the front face. The phototransmitting lens 13 is attached to the front-face-side end of the holder 421 (that is, the right end in the X-axis direction) so as to close the opening. Further, a light emitting substrate 53 to which the light source 11 is attached is attached to the rear face of the frame side face part 42. When the light emitting substrate 53 is attached to the frame side face part 42, the light source 11 is located at the rear-face-side end of the holder 421 (that is, the left end in the X-axis direction). Assuming that the face of the frame rear face part 43 on the side facing the scanning part 20 is its front face, a protruding holder 431 is provided on the front face. The phototransmitting lens 14 is attached to the front-face-side end (that is, the front end in the Z-axis direction) of the holder 431. Further, a light emitting substrate 54 to which the light source 12 is attached is attached to the rear face of the frame rear face part 43. When the light emitting substrate 54 is attached to the frame rear face part 43, the light source 12 is located at the rear-face-side end of the holder 431 (that is, the rear end in the Z-axis direction).

The partition part 44 is provided at a position that partitions the space in which the components of the phototransmitter 10 are arranged and the space in which the components of the photoreceiver 30 are arranged. The phototransmitting turning mirror 15, the photoreceiving turning mirror 33, and the photoreceiving lens 32 are attached to the partition part 44.

The internal space of the housing 6 is divided into two spaces, an upper space and a lower space, by the partition part 44 of the frame 40, the partition plate 22 of the scanning part 20, and the shield plate 83 of the lid part 8 described later. The upper space in which the phototransmitter 10 is installed is referred to as a phototransmitter space 6g, and the lower space in which the photoreceiver 30 is installed is referred to as a photoreceiver space 6h.

In this example, the holder 421 is provided integrally with the frame side face part 42, but it may be provided integrally with the light emitting substrate 53. Similarly, although the holder 431 is provided integrally with the frame rear face part 43, it may be provided integrally with the light emitting substrate 54.

[2-5. Operation of Light Detection Module]

The light output from the light source 11 is incident on the phototransmitting deflecting part 20a via the phototransmitting lens 13. The light output from the light source 12 passes through the phototransmitting lens 14 and is then bent by the phototransmitting turning mirror 15 by approximately 90° so that it is incident on the phototransmitting deflecting part 20a. The light incident on the phototransmitting deflecting part 20a is emitted through the front face 6a of the housing in a direction corresponding to the rotational angle of the mirror module 21. The range covered by the light emitted via the mirror module 21 is the scanning range. For example, the scanning range is a range of ±60° that extends along the X-axis direction with the front direction along the Z-axis being 0 degree.

The target object is located in a certain direction corresponding to the rotational position of the mirror module 21. The reflected light (hereinafter, arriving light) from the target object passes through the front face 6a of the housing and is reflected by the photoreceiving deflecting part 20b, and then is received by the photoreceiving element 31 via the photoreceiving lens 32 and the photoreceiving turning mirror 33. The certain direction corresponding to the rotational position of the mirror module 21 is the direction of light emission from the phototransmitting deflecting part 20a.

3. Lid Part

Figure 4:
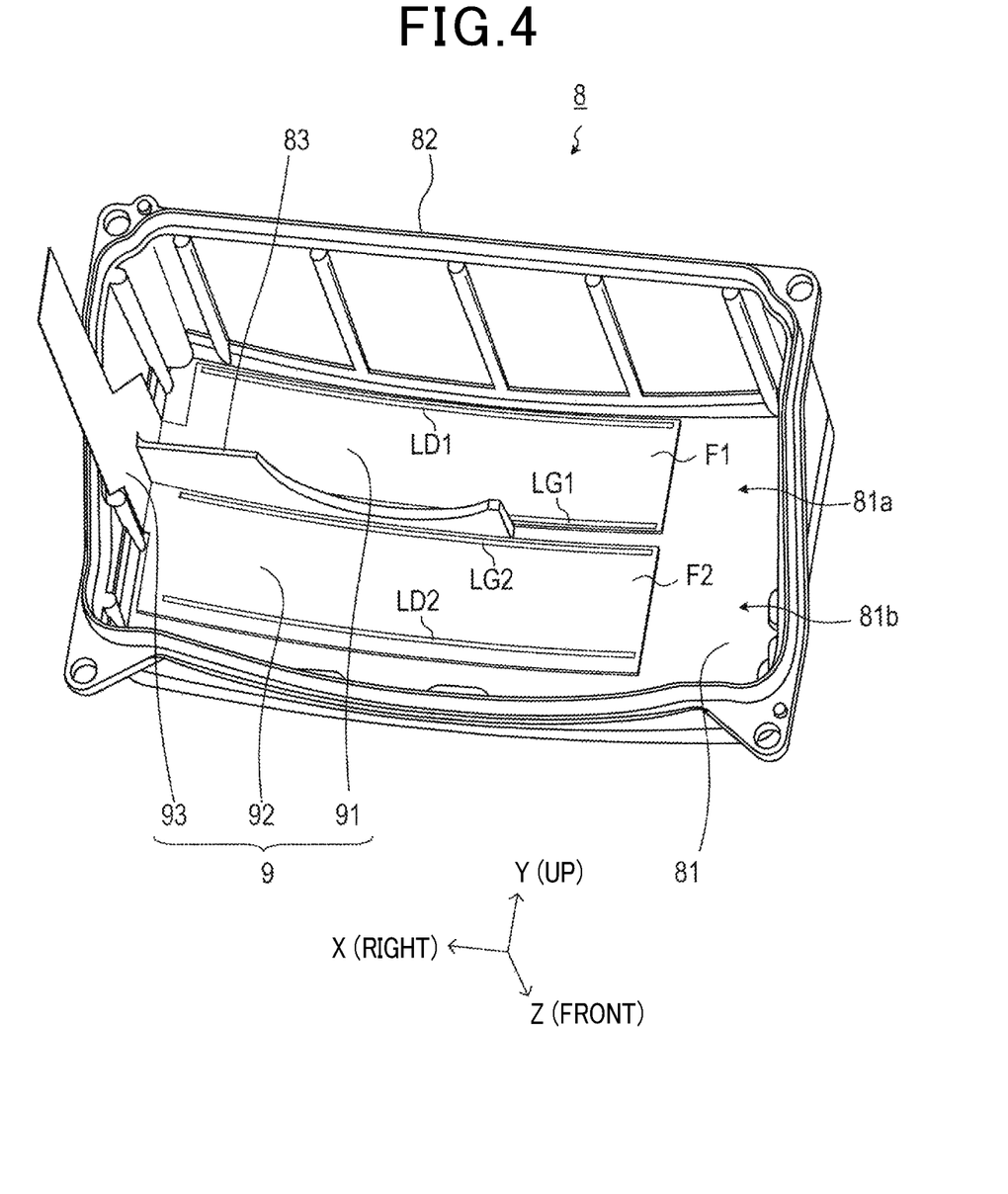
FIG. 4 is a perspective view showing the configuration of the inner face of the optical window.

As shown in FIGS. 4 and 5, the lid part 8 has an optical window 81, a frame body 82, and the shield plate 83.

The frame body 82 is a frame-like part that is formed of a resin material that blocks transmission of laser light emitted from the light sources 11 and 12. Except for the front face 6a of the housing, the frame body 82 constitutes the rest of the lid part 8.

The optical window 81 is provided so as to cover a substantially rectangular opening formed by the frame body 82, and forms the front face 6a of the housing 6. The optical window 81 is formed of a resin material that transmits laser light emitted from the light sources 11 and 12.

The shield plate 83 is a plate-like part provided near the center of the optical window 81 in the Y-axis direction and protrudes from the inner surface of the optical window 81 along the X-axis direction. As shown in FIGS. 2 and 3, the shield plate 83 is shaped so as to fill the gap generated between the partition plate 22 of the scanning part 20 and the optical window 81. Hereinafter, the part of the optical window 81 above the shield plate 83 and facing the phototransmitter space 6g is referred to as a part for the phototransmitter 81a, and the part of the optical window 81 below the shield plate 83 and facing the photoreceiver space 6h is referred to as a part for the photoreceiver 81b.

The shield plate 83 is formed of a resin material that blocks transmission of laser light emitted by the light sources 11 and 12. The optical window 81, the frame body 82, and the shield plate 83 are integrally formed. However, as shown in FIG. 5, the shield plate 83 is embedded so as to reach the outer surface of the optical window 81. As a result, light propagating within the optical window 81 is blocked by the shield plate 83, and thus light leakage between the phototransmitter 10 and the photoreceiver 30 via the optical window 81 can be suppressed.

4. Heater

The heater part 9 is used to heat the optical window 81. As shown in FIG. 4, the heater part 9 includes a phototransmitter heater 91 and a photoreceiver heater 92. The phototransmitter heater 91 and the photoreceiver heater 92 each have a transparent conductive film Fi and two electrodes LDi and LGi. Note that i is 1 when it belongs to the phototransmitter heater 91 and 2 when it belongs to the photoreceiver heater 92.

In the phototransmitter heater 91, the transparent conductive film (hereinafter referred to as the phototransmitter film) F1 is formed on the part for the phototransmitter 81a of the optical window 81 so that it covers at least the area through which the light emitted from the phototransmitter 10 to the scanning range via the scanning part 20 passes. The two electrodes (hereinafter referred to as the phototransmitter electrodes) LD1 and LG1 are placed parallel to each other and along the scanning direction at the upper and lower ends of the phototransmitter film F1, that is, at the edges of the phototransmitter film F1 that extend along the scanning direction.

In the photoreceiver heater 92, the transparent conductive film (hereinafter referred to as the photoreceiver film) F2 is formed on the part for the photoreceiver 81b of the optical window 81 so that it covers at least the area through which the light coming from the scanning range and being received by the photoreceiver 30 passes. As with the two phototransmitter electrodes LD1 and LG1, the two electrodes (hereinafter referred to as the photoreceiver electrodes) LD2 and LG2 are arranged in parallel to each other on the photoreceiver film F2.

These electrodes LDi and LGi are connected to a power source (not shown) via a flexible substrate 93.

For example, the transparent conductive films F1 and F2 may use ITO films. ITO is an inorganic compound of indium oxide and tin oxide. The films are not limited to this, and they may be any appropriate film formed of a material having transparency and electric conductivity.

5. Effects

According to the embodiment described above in detail, the following effects can be obtained.

(5a) In the lidar device 1, since the heater part 9 for heating the optical window 81 is composed of the transparent conductive film F1 and the electrodes LDi, LGi, the entire transparent electrode film F1 sandwiched between the two electrodes LDi, LGi can be heated evenly. As a result, the parts of the optical window 81 that transmit light can be efficiently heated.

(5b) In the lidar device 1, the transparent conductive films F1 and F2 are individually formed, respectively on the part for the phototransmitter 81a and the part for the photoreceiver 81b of the optical window 81. In addition, the two electrodes LDi and LGi for energizing each transparent conductive film F1 extend along the scanning direction. Therefore, the distance between the two electrodes LDi and LGi can be reduced, which makes it possible to heat the optical window efficiently to the required temperature at a relatively low voltage.

6. Other Embodiments

An embodiment for implementing the present disclosure has been described above, but the present disclosure is not limited to the above-described embodiment and can be implemented with various modifications.

Figure 6:
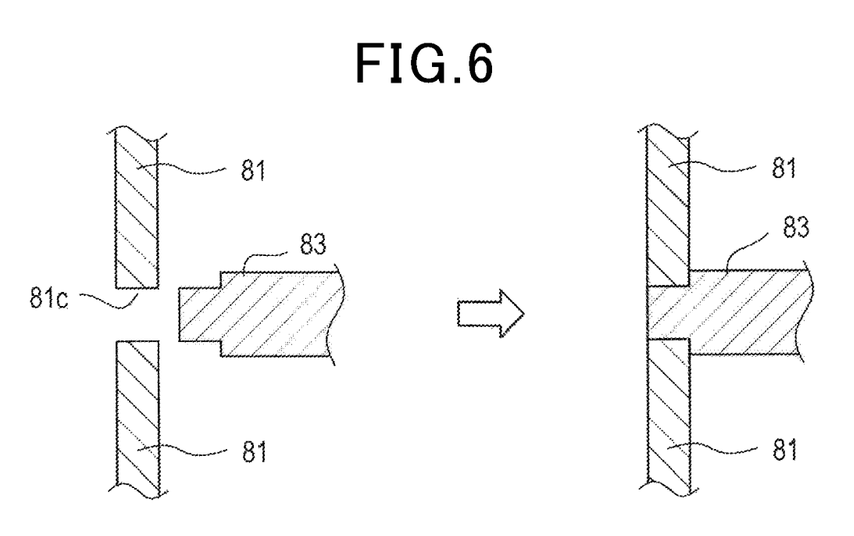
FIG. 6 is a schematic view showing a part of the configuration of the optical window in a modified example, as viewed from the side.

(6a) In the above embodiment, the shield plate 83 is integrally formed with the optical window 81, but the present disclosure is not limited to this. For example, the shield plate 83 may be integrally formed with the frame 40 of the light detection module 2. In this case, as shown in FIG. 6, the optical window 81 is provided with an insertion part 81c which is a hole or a groove into which the leading end of the shield plate 83 is inserted. The leading end of the shield plate 83 is formed so that the leading end of the shield plate 83 reaches the outer surface of the optical window 81 or the bottom of the groove when the lid part 8 is attached to the housing body 7. As with the above-described embodiment, this configuration also makes it possible to prevent light leakage between the phototransmitter 10 and the photoreceiver 30 via the optical window 81. FIG. 6 shows a case where the insertion part 81c is a hole.

(6b) In the above embodiment, the two electrodes LDi and LGi are wired along the scanning direction, but instead they may be wired along the direction orthogonal to the scanning direction.

(6c) A plurality of functions realized by a single component of the above embodiment may be realized by a plurality of components, or a single function realized by a single component may be realized by a plurality of components. Further, a plurality of functions realized by a plurality of components may be realized by a single component, or a single function realized by a plurality of components may be realized by a single component. Furthermore, a part of the configuration of the above embodiments may be omitted. Furthermore, at least a part of the configuration of the above embodiment may be added or substituted in the configuration of the other embodiments described above.

(6d) In addition to the lidar device 1 described above, the present disclosure can be realized in various forms such as a system including the lidar device 1 as a component.

What is claimed is:

1. A lidar device comprising:
a light detection module that includes:
a phototransmitter configured to transmit light to be scanned along a preset scanning direction; and
a photoreceiver configured to receive light arriving from a scanning range;
an optical window that is provided in a housing in which the light detection module is housed, and is configured to enable both the transmitted light and the received light by the light detection module to pass therethrough;
a shield plate that protrudes from an inner face of the optical window facing the inside of the housing, and is placed between a first space in which the phototransmitter is provided and a second space in which the photoreceiver is provided, the shield plate being configured to prevent light leakage between the phototransmitter and the photoreceiver; and
a heater part that is configured to heat the optical window, wherein,
the inner face of the optical window is partitioned by the shield plate into a first part for the phototransmitter and a second part for the photoreceiver, the first part for the phototransmitter being arranged to face the first space, the second part for the photoreceiver being arranged to face the second space,
the heater part includes:
a first film that is a transparent conductive film arranged to cover the first part for the phototransmitter,
a second film that is a transparent conductive film arranged to cover the second part for the photoreceiver,
two phototransmitter electrodes configured to energize the first film, and
two photoreceiver electrodes configured to energize the second film, and the shield plate is integrally formed with a frame of the light detection module, and
the optical window comprises an insertion part that is a hole or a groove in which a leading end of the shield plate is filled, the leading end of the shield plate being arranged to be in contact with the optical window.

2. The lidar device according to claim 1, wherein, the phototransmitter and the photoreceiver are placed so as to align with each other along a direction orthogonal to the scanning direction.

3. The lidar device according to claim 1, wherein the two phototransmitter electrodes and the two photoreceiver electrodes are each placed parallel to the scanning direction at an edge of the corresponding phototransmitter film or the corresponding photoreceiver film extending along the scanning direction.

\* \* \* \* \*